W. F. WERLINE.
GAFF.
APPLICATION FILED JUNE 15, 1910.
983,102.
Patented Jan. 31, 1911.
2 SHEETS—SHEET 1.
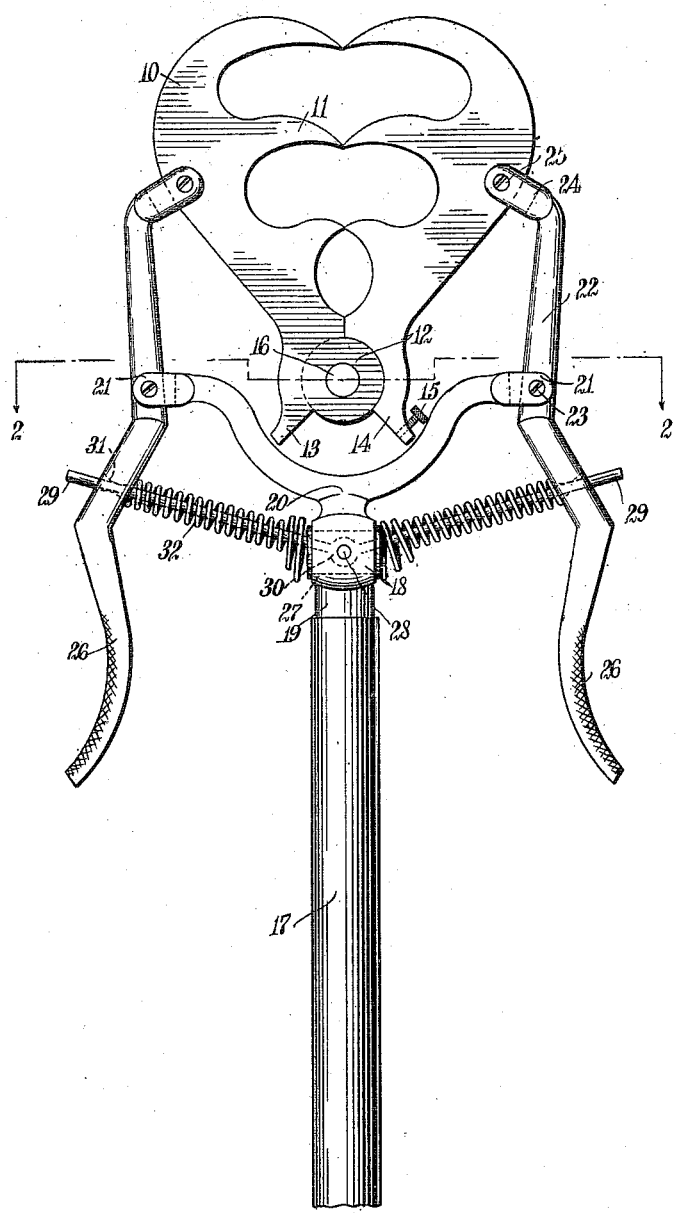
WITNESSES:
INVENTOR
William F. Werline
BY Munn & Co
ATTORNEYS
THE NORRIS PETERS CO., WASHINGTON, D. C.

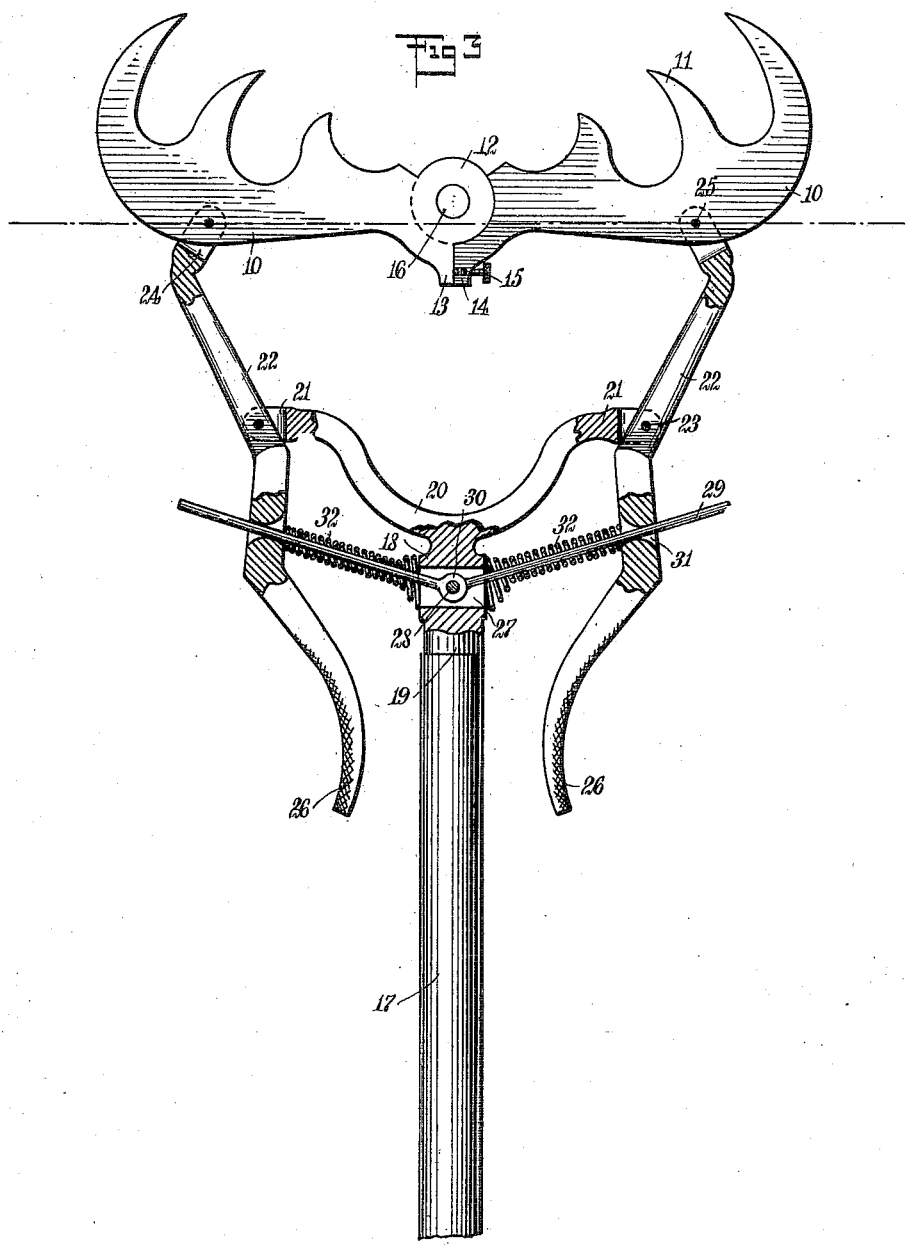

UNITED STATES PATENT OFFICE.

WILLIAM FREDERICK WERLINE, OF DENISON, TEXAS.

GAFF.

983,102.

Specification of Letters Patent.   Patented Jan. 31, 1911.

Application filed June 15, 1910.   Serial No. 566,985.

*To all whom it may concern:*

Be it known that I, WILLIAM F. WERLINE, a citizen of the United States, and a resident of Denison, in the county of Grayson and State of Texas, have invented a new and Improved Gaff, of which the following is a full, clear, and exact description.

This invention relates to gaffs for use in fishing and for catching small animals, and for like purposes, and has reference more particularly to a device of this class which comprises relatively movable jaws for seizing the fish or animal, and adapted to be set in open positions, and means tending to hold the jaws closed, and to close the same when the jaws are open, the jaws when set holding the means inoperative, whereby the jaws themselves can be actuated to release them from their open positions and to render the closing means operative.

The object of the invention is to provide a simple, strong and durable gaff by means of which fish, small animals and the like can be securely seized and held, which can be easily manipulated by means of one hand, thereby leaving the other hand free for other purposes, which can be set so that the jaws are open, and will automatically close when brought into engagement with the body of the fish or animal, and which can be adjusted so that the jaws will close with greater or less ease when brought into engagement with a body to be held.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a side elevation of an embodiment of my invention, showing the jaws of the gaff closed; Fig. 2 is a transverse section on the line 2—2 of Fig. 1; Fig. 3 is a side elevation of the gaff, showing parts in cross section and illustrating the jaws set in their open positions.

Before proceeding to a more detailed explanation of my invention, it should be clearly understood that while the same is particularly useful in fishing, to permit the fisherman to seize and hold the fish after it has been brought within his reach by means of a line, a net, or in any other manner, the gaff can also be used for catching small animals such as frogs and the like. The jaws may be provided with any suitable number of teeth or prongs, and if desired, may be provided with barbs.

Certain of the details of construction form no part of the invention, and can be varied in accordance with individual preference and special conditions, without departing from the underlying spirit of the invention.

Referring more particularly to the drawings, I have shown for example, a pair of jaws 10, each having three slightly curved teeth 11, the points of which are in juxtaposition when the jaws are closed. The outer edges of the jaws are preferably rounded, and they are connected at their inner ends by means of a pivoted joint 12, having a suitable rivet 16. The jaws, at the joint ends have stop extensions or shoulders 13 and 14 respectively, which are adapted to engage when the jaws are extended and in their open positions, as shown in Fig. 3. The stop 14 has a set-screw 15, adapted to engage the stop 13, and adjustable to vary the engagement of the stops, for a purpose which will appear more clearly hereinafter.

The device is provided with a staff or handle rod 17, of any suitable length and form, by means of which the gaff can be easily manipulated. At the upper end it carries a head 18, mounted upon the end of the staff by means of a suitable ferrule 19. The head has secured thereto, and preferably integral therewith, a curved fulcrum bar or fork 20, the ends 21 of which are oppositely disposed and bifurcated. Between the sides of the bifurcated ends 21, are pivotally mounted lever arms 22, by means of pivot screws or rivets 23. The lever arms have the jaw ends 24 bifurcated. The ends 24 pivotally receive between the sides thereof the receiving jaws, which are secured movably in position by means of pivot screws 25 or the like. At the opposite ends, the lever arms have grip extensions 26, slightly curved and enlarged, so that they can be easily manipulated to open the jaws when the extensions are pressed toward each other.

The head 18 has a transverse opening 27 within which is located a cross pin 28. Guide rods 29 are movably mounted upon the cross pin 28, by means of eyes 30. At their inner ends they extend through suitable openings 31 of the lever arms. These openings are outwardly tapered at their ends, and rounded. Helical springs 32 are mounted upon the guide rods 29 and engage at the head 18, and at the lever arms, tending to force the latter outward and thereby to move the jaws into their normal, closed positions, and to hold them in the closed positions. The openings 31 are so formed that the lever arms and the guide rods are freely movable relative to one another.

When it is desired to open the jaws and set the gaff, the grip extensions 26 of the lever arms are forced toward each other. This swings the jaws outward and moves the joint thereof upward almost into alinement with the pivot connections between the ends 24 of the lever arms and the jaws. A slight pressure at the joint of the jaws forces the joint outwardly beyond a line passing through the jaws at the ends of the lever arms, as is indicated in Fig. 3. This brings the stops at the ends of the jaws into engagement. The thrust of the springs is then resisted by the engagement of the stops and the springs, and inoperative to move the jaws, the latter being held in their open, set positions, as is indicated in Fig. 3. When the gaff is employed to seize a body, the jaws are brought into engagement with the body. This forces the joint connecting the jaws inward, and beyond the line connecting the joints between the ends 24 of the lever arms and the jaws. The result is that the springs at once become operative to force the jaws into or toward their closed positions, and the body is securely gripped by the prongs of the jaws.

By adjusting the set-screw 15, the force necessary to release the jaws by pressing inwardly at the joint thereof can be regulated. The springs 32 can be easily removed and replaced with others of greater or lesser tension, by unscrewing the screws 23 and swinging the lever arms outwardly. When the new springs are in place the lever arms can be returned to their original positions and the members 23 screwed back. This entire operation can be executed in a very few moments.

Having thus described my invention, I claim as new, and desire to secure by Letters Patent:

1. A gaff, comprising a staff, members each having a single pivotal connection with said staff, jaws pivotally connected and each pivotally secured to one of said members, and resilient means in direct operative relation with said members, and tending to hold said jaws closed.

2. A gaff, comprising a staff, movable members carried thereby, movable jaws each carried by one of said members, and resilient means engaging said members directly to hold the same in positions such that said jaws are closed, said jaws being adapted to be set in open positions, and having means for holding said first-mentioned means inoperative.

3. A gaff, comprising a staff, lever arms pivotally carried thereby, pivotally connected jaws, each pivotally connected to one of said lever arms, and springs engaging said lever arms and tending to close said jaws.

4. A gaff, comprising a staff, lever arms pivotally carried thereby, pivotally connected jaws, each pivotally connected to one of said lever arms, said jaws having stops adapted to engage when said jaws are in open positions, and springs engaging said lever arms and tending to move the same into positions such that said jaws are closed, said stops when said jaws are open, receiving the thrust of said springs, whereby the jaws are held open.

5. A gaff, comprising a staff, a fulcrum bar carried thereby, lever arms each pivotally mounted at an end of said bar, pivotally connected jaws each pivotally carried by one of said lever arms, said lever arms having grip extensions, whereby they can be manually operated, guide members movably carried by said staff, and springs mounted upon said guide and each engaging one of said lever arms, whereby said springs tend normally to close said jaws.

6. A gaff, comprising a staff, a head carried thereby and having a fulcrum bar, lever arms each pivotally carried at an end of said fulcrum bar, said lever arms having openings therethrough, guide rods movably carried by said head, and each projecting through one of said openings, springs upon said guide rod and engaging said heads and said arms, said arms having grip extensions, whereby they can be manipulated, and pivotally connected jaws each pivotally secured at an end of one of said lever arms, said jaws at the joints having stops adapted to engage when said jaws are open, one of said stops having an adjusting screw.

In testimony whereof I have signed my name to this specification in the presence of two subscribing witnesses.

WILLIAM FREDERICK WERLINE.

Witnesses:
A. H. L. DECKER,
W. S. PEARSON.